United States Patent
Davis

(10) Patent No.: US 7,283,526 B2
(45) Date of Patent: Oct. 16, 2007

(54) METHOD AND SYSTEM FOR PROVIDING A SYMMETRIC KEY FOR MORE EFFICIENT SESSION IDENTIFICATION

(75) Inventor: Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 09/908,836

(22) Filed: Jul. 19, 2001

(65) Prior Publication Data

US 2003/0016653 A1    Jan. 23, 2003

(51) Int. Cl.
*H04L 12/28*    (2006.01)

(52) U.S. Cl. .................. 370/392; 370/252; 370/351; 370/401

(58) Field of Classification Search ............... 370/389, 370/392, 400, 401, 469, 252
See application file for complete search history.

(56) References Cited

U.S. PATENT DOCUMENTS

| | | | | |
|---|---|---|---|---|
| 5,008,815 A | * | 4/1991 | Hillis | 712/11 |
| 5,038,345 A | | 8/1991 | Roth | 370/94.1 |
| 5,268,962 A | * | 12/1993 | Abadi et al. | 713/161 |
| 5,321,695 A | | 6/1994 | Faulk, Jr. | 370/94.1 |
| 5,337,309 A | | 8/1994 | Faulk, Jr. | 370/60 |
| 5,341,426 A | * | 8/1994 | Barney et al. | 713/171 |
| 5,384,722 A | * | 1/1995 | Dulong | 708/201 |
| 5,477,547 A | | 12/1995 | Sugiyama | 370/85.13 |
| 5,692,124 A | * | 11/1997 | Holden et al. | 726/2 |
| 6,023,510 A | * | 2/2000 | Epstein | 705/74 |
| 6,105,134 A | * | 8/2000 | Pinder et al. | 713/170 |
| 6,157,635 A | | 12/2000 | Wang et al. | 370/352 |
| 6,173,313 B1 | * | 1/2001 | Klots et al. | 709/203 |
| 6,212,636 B1 | * | 4/2001 | Boyle et al. | 713/168 |
| 6,321,336 B1 | * | 11/2001 | Applegate et al. | 713/201 |
| 6,438,612 B1 | * | 8/2002 | Ylonen et al. | 709/249 |
| 6,502,135 B1 | * | 12/2002 | Munger et al. | 709/225 |
| 6,597,661 B1 | * | 7/2003 | Bonn | 370/235 |
| 6,661,799 B1 | * | 12/2003 | Molitor | 370/401 |
| 6,704,866 B1 | * | 3/2004 | Benayoun et al. | 713/151 |
| 6,708,273 B1 | * | 3/2004 | Ober et al. | 713/189 |
| 6,728,379 B1 | * | 4/2004 | Ishibashi et al. | 380/278 |
| 6,741,552 B1 | * | 5/2004 | McCrosky et al. | 370/218 |
| 6,826,684 B1 | * | 11/2004 | Fink et al. | 713/160 |

(Continued)

FOREIGN PATENT DOCUMENTS

GB    2333032    7/1999

(Continued)

*Primary Examiner*—Wing Chan
*Assistant Examiner*—Andrew C. Lee
(74) *Attorney, Agent, or Firm*—Sawyer Law Group LLP

(57) ABSTRACT

A method and system for identifying sessions in a computer network is disclosed. The session is between a first computer system and a second computer system. The session consists of an exchange of a plurality of packets between the computer systems. Each of the packets includes source information and destination information relating to the first computer system and the second computer system. The method and system include providing a symmetric key and identifying the session using the symmetric key. The symmetric key is provided utilizing a manipulation of the source information and the destination information. The symmetric key is associated with the plurality of packets traveling between the first computer system and the second computer system.

6 Claims, 4 Drawing Sheets

U.S. PATENT DOCUMENTS

| | | | |
|---|---|---|---|
| 6,829,239 B1 * | 12/2004 | Bhatia et al. | 370/392 |
| 6,851,050 B2 * | 2/2005 | Singhal et al. | 713/162 |
| 6,868,407 B1 * | 3/2005 | Pierce | 705/60 |
| 6,886,103 B1 * | 4/2005 | Brustoloni et al. | 713/201 |
| 6,931,529 B2 * | 8/2005 | Kunzinger | 713/153 |
| 6,934,839 B1 * | 8/2005 | Pagel | 713/156 |
| 6,941,366 B2 * | 9/2005 | Antes et al. | 709/224 |
| 6,963,982 B1 * | 11/2005 | Brustoloni et al. | 713/160 |
| 6,983,366 B1 * | 1/2006 | Huynh et al. | 713/168 |
| 2003/0014650 A1 * | 1/2003 | Freed et al. | 713/189 |

FOREIGN PATENT DOCUMENTS

GB      2344033      5/2000

* cited by examiner

50

60

METHOD AND SYSTEM FOR PROVIDING A SYMMETRIC KEY FOR MORE EFFICIENT SESSION IDENTIFICATION

FIELD OF THE INVENTION

The present invention relates to computer systems, and more particularly to a method and system for more efficiently identifying sessions between computer systems, such as a client and a server.

BACKGROUND OF THE INVENTION

Driven by increasing usage of a variety of network applications, such as those involving the Internet, computer networks are of increasing interest. FIG. 1 depicts conventional computer networks 1 and 15 coupled via the Internet 14. The conventional computer network 1 includes router 2, clients 4, and 6 and servers 8, 10 and 12. The conventional computer network 15 includes router 16, clients 18, 20 and 22 and server 24. The conventional computer networks 1 and 15 may also have other constituents, including other computer systems and/or additional routers, that are not shown for clarity.

The components of the computer networks 1 and 15 may desire to communicate, for example through the Internet 14. For example, a client 2 may communicate with the server 24. Similarly, the client 18 may communicate with the server 8. In order to do so, a session is established between computer systems. In the session, data packets are sent between the computer systems involved in the session. Each packet is associated with a source from which the packet originates and a destination to which the packet is to be sent. Thus the source and destination are each one of the computer systems 4, 6, 8, 10, 12, 18, 20, 22 or 24. Each packet includes information relating to the computer systems involved in the session, typically in an IP five-tuple, that is used to route the packet to the appropriate computer system.

FIG. 2 is a block diagram depicting an IP five-tuple 30. The IP five-tuple 30 is taken from various fields in an IP header and TCP header of a packet. The IP five-tuple 30 includes five fields, the protocol 32, two source fields 34 and 36 and two destination fields 38 and 40. The source fields are the source address 34 and the source port 36. The destination fields are the destination address 38 and the destination port 40. The source address 34 is typically the IP address of the source. The source port 36 and destination port 40 are associated with the software application connected to the TCP protocol layer. The destination address 39 is typically the IP address of the destination for the packet.

In a session, each computer system involved in the session sends packets to the other computer system involved in the session. Thus, packets for a session travel in two directions, to and from each computer system. The destination for a packet traveling in one direction is the source for a packet traveling in the opposite direction. For example, suppose a session is established between the client 4 and the client 20. For a packet traveling from the client 4 to the client 20, the source is the client 4 and the destination is the client 20. However, for a packet traveling from the client 20 to the client 4, the source is the client 20 and the destination is the client 4. Thus, for a particular session, different packets may have the source fields 34 and 36 and the destination fields 38 and 40 interchanged.

In order to keep track of the ongoing sessions and store information used in routing packets for the sessions, a session table is typically used. FIG. 3 depicts a conventional session table 50. The conventional session table 50 is typically kept by a router, such as the routers 2 and 16. The conventional session table 50 includes a plurality of entries. For clarity, only four entries 52, 54, 56 and 58 are marked. Each of the entries 52, 54, 56 and 58 includes data for a corresponding session. This data is used to forward packets for the session to the appropriate destination using the appropriate ports. The conventional session table 50 includes two entries for each session. Thus, the entries 52 and 54 relate to one session, while the entries 56 and 58 relate to another session. The entries 52, 54, 56 and 58 are indexed using a concatenation of the protocol 32, source address 34, source port 36, destination address 38 and destination port 40. The concatenation of the protocol 32, source address 34, source port 36, destination address 38 and destination port 40 is typically hashed in order to provide the index for the session.

FIG. 4 depicts a conventional method 60 for accessing information for a particular packet related to a particular session in the conventional session table 50. The conventional method 60 utilizes an IP five-tuple. Thus, the conventional method will thus be described in conjunction with FIGS. 2 and 3. A key is obtained by concatenating the fields 32, 34, 36, 38 and 40 of the IP five-tuple for the packet, via step 62. The protocol 32, source address 34, source port 36, destination address 38 and destination port 40 are concatenated in a particular order to form the key. The key is then used to search the session table 50 for the index which matches the key, via step 64. Step 64 typically includes applying a hash function to the concatenation of the protocol 32, the source address 34, source port 36, destination address 38 and destination port 40 and searching for the index which matches this hash. In addition, step 64 may require collision resolution for cases where multiple entries index into the same entry in the table 50. In other words, collision resolution is used where the same index, or key, results from applying the hash function to two different search keys. Step 64 results in the index for the entry containing data relating to the session of interest. Once the index is obtained, the data in the corresponding entry is accessed, via step 66. Using the data in the entry, the packet can be forwarded or otherwise manipulated in accordance with the information in the entry for the session and session state information can be updated as required.

Although the conventional session table 50 and the conventional method 60 allow the packets for the session to be forwarded to the destination, one of ordinary skill in the art will readily recognize that the method 60 and the conventional session table 50 are inefficient. The conventional session table 50 includes two entries 52 and 54 or 56 and 58 for each session. One entry is for packets traveling in one direction, while the second entry is for packets traveling in the opposite direction. For example, if a session is established between the client 6 and the server 24, packets can travel from the client 6 to the server 24 and from the server 24 to the client 6. The source fields 34 and 36 and the destination fields 38 and 40 of packets traveling from the client 6 to the server 24 are the destination fields and the source fields of packet traveling form the server 24 to the client 6. Thus, a concatenation of the source and destination fields for a packet traveling in one direction is different from a concatenation of the source and destination fields for a packet traveling in the opposite direction. Consequently, the index for the session differs slightly depending upon the direction of travel of the packets. Thus, the conventional session table 50 must include two entries 52 and 54 for each session. Moreover, a large number of sessions are typically occurring at a particular time. Thus, the conventional session table 50 consumes a large amount of memory. Furthermore, the sessions that are ongoing change relatively rapidly. Thus, the conventional session table must be updated with insertions for new sessions and deletions for completed sessions. Because two entries 52 and 54 are required for each session, each new session requires two insertions. Similarly, the completion of each session requires two deletions. Session state information must also be duplicated. These operations consume resources of the router 2 or 16. Thus, upkeep of the conventional session table 50 may be more time consuming and require more resources than desired.

Accordingly, what is needed is a system and method for more efficiently identifying sessions. The present invention addresses such a need.

SUMMARY OF THE INVENTION

The present invention provides a method and system for identifying sessions in a computer network. The session is between a first computer system and a second computer system that are exchanging a plurality of packets. Each of the plurality of packets includes a packet including source information and destination information relating to the first computer system and the second computer system. The method and system include providing a symmetric key and identifying the session using the symmetric key. The symmetric key is provided utilizing a manipulation, preferably an arithmetic manipulation, of the source information and the destination information. The symmetric key is associated with the plurality of packets traveling between the first computer and the second computer system.

According to the system and method disclosed herein, the present invention provides a key which allows session information to be more efficiently stored and accessed.

DETAILED DESCRIPTION OF THE INVENTION

The present invention relates to an improvement in communication between computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for identifying sessions in a computer network. The session is between a first computer system and a second computer system. The session consists of an exchange of multiple packets between the first and second computer systems. Each packet includes source information and destination information relating to the first computer system and the second computer system. The method and system include providing a symmetric key and identifying the session using the symmetric key. The symmetric key is provided utilizing a manipulation of the source information and the destination information. The symmetric key is associated with the plurality of packets traveling between the first computer system and the second computer system.

The present invention will be described in terms of particular computer systems in particular networks. However, one of ordinary skill in the art will readily recognize that this method and system will operate effectively for other computer systems and other computer networks. Furthermore, the present invention will be described in terms of particular information in an IP five-tuple for a packet. However, one of ordinary skill in the art will readily recognize that the method and system can operate effectively for other fields or other information identifying the packet, the session and/or the source and destination of the packet.

Figure 5:
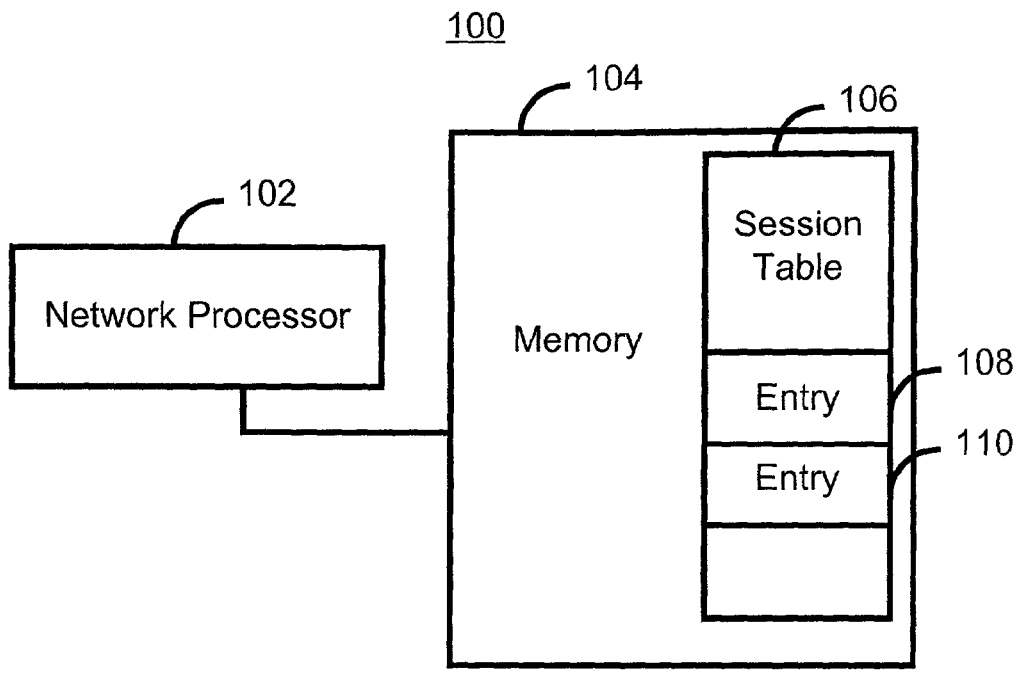
FIG. 5 is one embodiment of a system in accordance with the present invention for efficiently identifying session in a computer network using a symmetric key.

To more particularly illustrate the method and system in accordance with the present invention, refer now to FIG. 5, depicting one embodiment of a system 100 in accordance with the present invention for efficiently identifying a session in a computer network using a symmetric key. The system 100 includes a network processor 102 and a memory 104 including a session table 106. The network processor 102 preferably resides in a router, such as the router 2 or 16. The session table 106 generally includes a plurality of entries. However, for clarity only two entries 108 and 110 are shown. The network processor 102 preferably implements the method in accordance with the present invention, described below.

Figure 1:
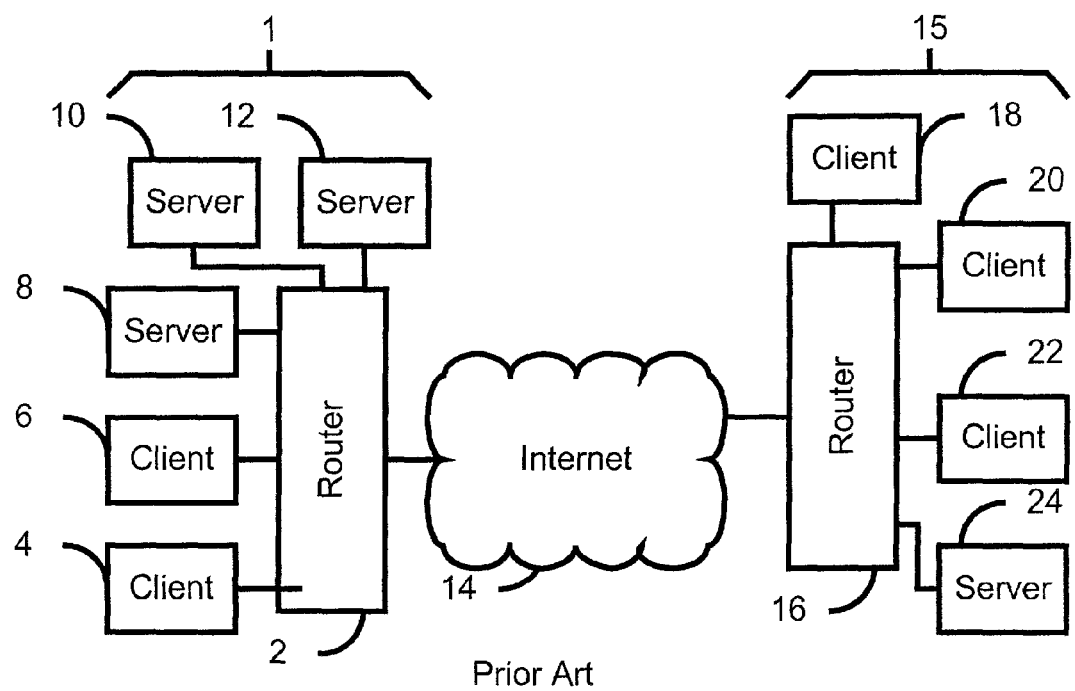
FIG. 1 is a block diagram of a conventional computer network.
Figure 2:
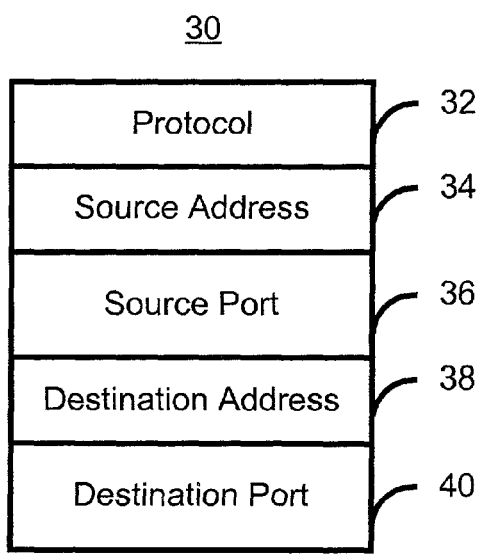
FIG. 2 is a block diagram of a conventional IP five-tuple.
Figure 3:
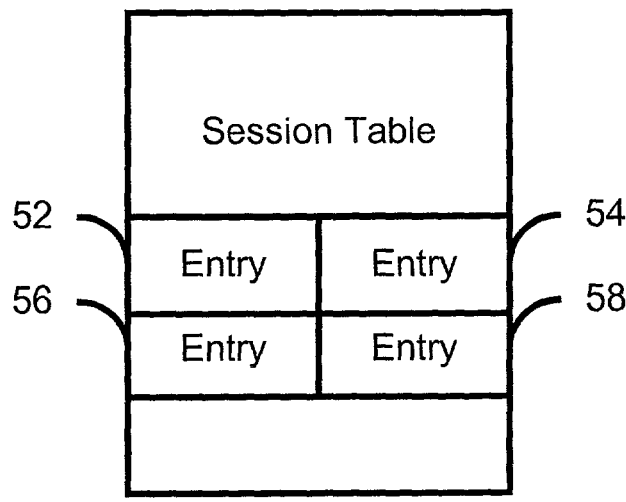
FIG. 3 is a diagram of a conventional session table.
Figure 6:
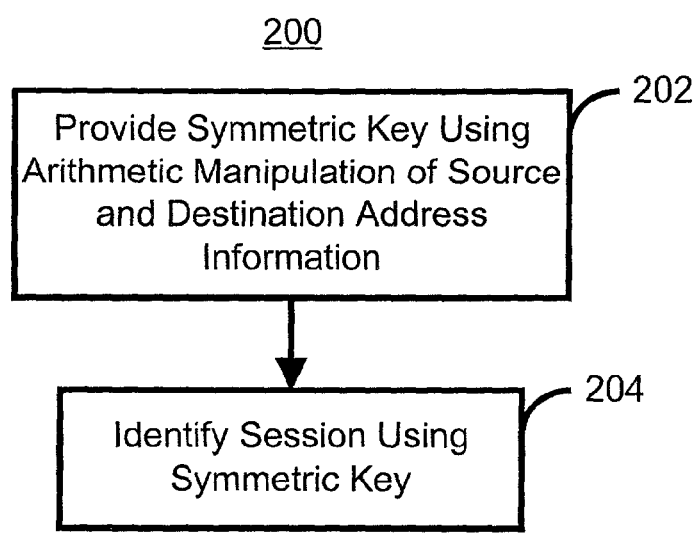
FIG. 6 is a high-level flow chart depicting one embodiment of a method in accordance with the present invention for efficiently identifying sessions in a computer network.

FIG. 6, depicting a high-level flow chart of one embodiment of a method 200 in accordance with the present invention for efficiently identifying sessions in a computer network. The method 200 may be used in a computer network, such as the computer networks 1 and 15. Furthermore, the method 200 preferably utilizes the IP five-tuple 30 for packets. The method 200 is performed for a packet associated with a particular session between a first and a second computer system. The method 200 is preferably implemented by the network processor 102. Consequently, the method 200 is described in conjunction with FIGS. 1 (depicting computer networks 1 and 15), 2 (depicting the IP five-tuple 30), and 5 (depicting the system 100).

Referring to FIGS. 1, 2, 5 and 6, a symmetric key for the packet traveling between a first and the second computer system is provided, via step 202. The key is symmetric in that the key will be the same regardless of whether the packet is traveling from the first computer system to the second computer system or from the second computer system to the first computer system. For example, if the first and second computer systems are the client 4 and the server 24, respectively, the symmetric key will be the same for a packet traveling from the client 4 to the server 24 as for a packet traveling from the server 24 to the client 4. The symmetric key is provided using a manipulation of the source and destination information. The symmetric key is preferably formed using an arithmetic manipulation of the source address information, such as is found in the source fields 34 and 36, and the destination address information, such as is found in the destination fields 38 and 40. The symmetric key may also include other data, such as the protocol 32. The session is identified using the symmetric key, via step 204. In one embodiment, step 204 includes indexing a single entry in the session table 106 using the symmetric key.

Because the symmetric key is symmetric, the same symmetric key can be used to identify the session regardless of the direction of travel of the packet. As a result a single entry can be used for each session in the session table 106. Thus, entries 108 and 110 can be for different sessions. The size of the session table 106 can thus be cut in half. Thus, the memory 102 can, therefore, be used more efficiently. Furthermore, the number of insertions and deletions required to maintain the session table 106 can be reduced by substantially the same factor. As a result, the resources consumed in maintaining the session table 106 can also be reduced. Thus, the method 200 can allow the network processor 102 to more efficiently manage sessions.

Figure 7:
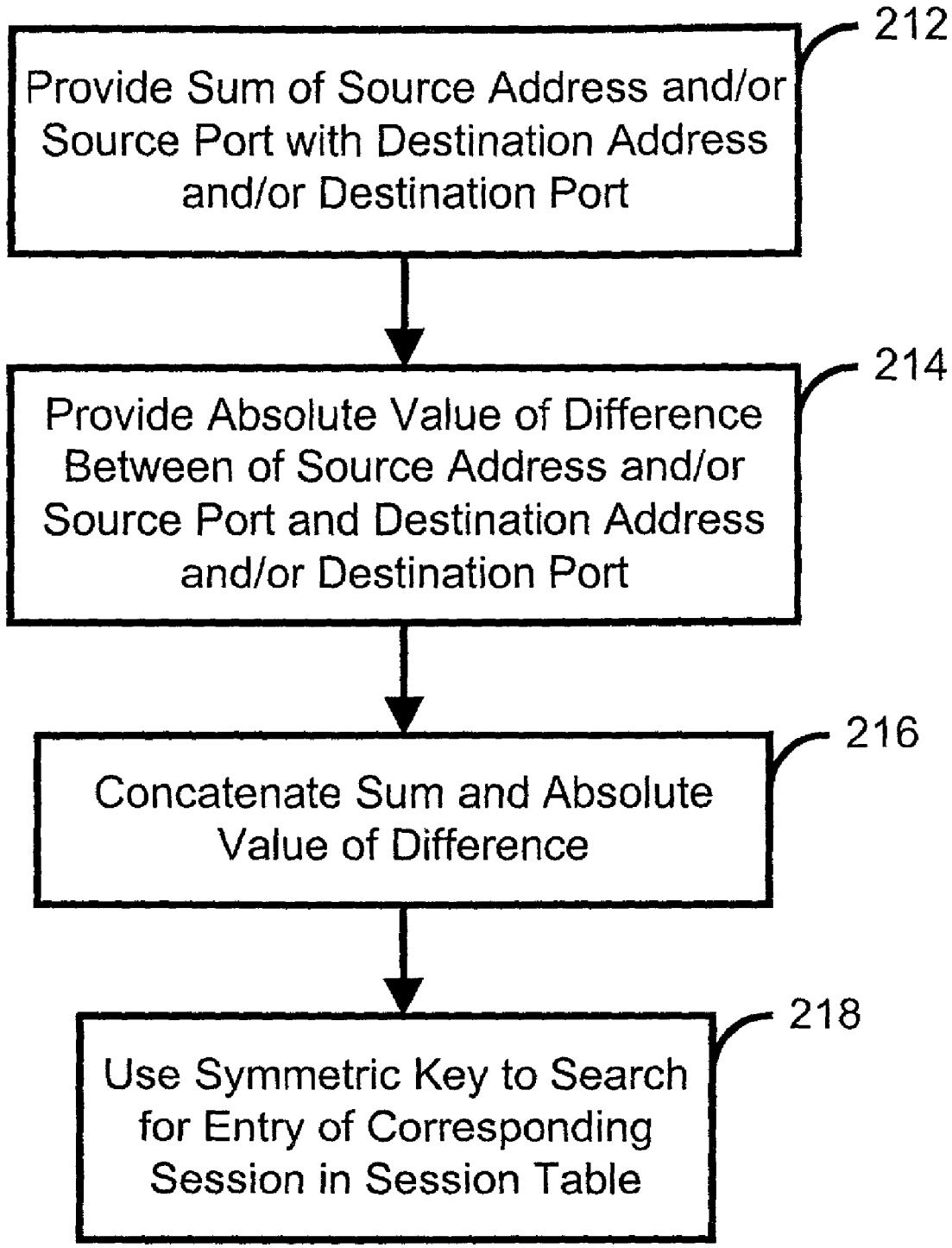
FIG. 7 is a more detailed flow chart of one embodiment of a method in accordance with the present invention for efficiently identifying session in a computer network using a symmetric key.

FIG. 7 is a more detailed flow chart of one embodiment of a method 210 in accordance with the present invention for efficiently identifying session in a computer network using a symmetric key. The method 210 may be used in a computer network, such as the computer networks 1 and 15. Furthermore, the method 210 preferably utilizes the IP five-tuple 30 for packets. The method 210 is performed for a packet associated with a particular session between a first and a second computer system. The method 210 is also preferably implemented by the network processor 102. Consequently, the method 210 is described in conjunction with FIGS. 1, 2 and 5.

Referring to FIGS. 1, 2, 5 and 7, the source address 34 and/or source port 36 and the destination address 38 and/or destination port 40 are added to provide a sum, via step 212. Step 212 is preferably performed by concatenating the source address 34 with the source port 36 and concatenating the destination address 38 with the destination port 40, then adding the concatenation of the source address 34 and the source port 36 bit by bit with the concatenation of the destination address 38 and the destination port 40. Note that instead of the concatenations described above, the source address 34 and/or the source port 36 and the destination address 48 and/or the destination port 40 can be added separately and the results of the two additions concatenated. The absolute value of the difference between the concatenation of the source address 34 and/or source port 36 and the concatenation of the destination address 38 and/or destination port 40 is determined, via step 214. Step 214 is preferably performed by subtracting the concatenation of the source address 34 and source port 36 bit by bit with the concatenation of the destination address 38 and the destination port 40. Alternatively, the two parameters could be subtracted separately and the results of the two subtractions concatenated. Step 216 may also include concatenating the protocol 32 or other information with the sum and the absolute value of the difference. Steps 212 through 216 thus provide a symmetric key.

The symmetric key provided in steps 212-216 both uniquely identifies the packet using the source fields 34 and 36 and the destination fields 38 and 40 and is symmetric. This can be seen from the mathematical properties of the operations chosen in steps 212-216. Suppose that the source address 34 and/or the source port 36 can be represented by a number, A. Similarly, the destination address 38 and/or the destination port 40 can be represented by a number B. A system of two first order linear equations with two unknowns uniquely identifies the unknowns. Thus, A and B can identify two unknowns, X and Y as follows.

$$A+B=Y \qquad (1)$$

$$A-B=Z \qquad (2)$$

Y and Z correspond to the two components of the symmetric key being provided. These equations can be solved for A and B as follows:

$$A=(Y+Z)/2 \qquad (3)$$

$$B=(Y-Z)/2 \qquad (4)$$

Thus, the sum and difference formed in steps 212 and 214 are unique to the source address 34, the source port 36, the destination address 38 and the destination port 40.

In addition to uniquely identifying the source address 34, source port 36, destination address 38 and destination port 40, it is desired that Y and Z be the same when the source fields 34 and 36 are interchanged with the destination fields 38 and 40, respectively. Although the quantity A+B is the same as B+A, this is not true for A−B and B−A. Instead, A−B is the opposite of B−A. However, the absolute value of the difference between A and B is the same as the absolute value of the difference between B and A. Thus, the quantity Z' can be defined as:

$$|A-B|=Z' \qquad (5)$$

As a result, both Y and Z' will be the same even when source address information and destination address information is interchanged. Note that the absolute value operation results in two solutions to the equation, but the two solutions differ only in the sign of the two solutions (i.e. the direction of packet flow), which is precisely the desired result. Consequently, Y and Z' will be the same for packets traveling from a first computer system to a second computer system as for packets traveling from the second computer system to the first computer system. A key made from some combinations of Y and Z' will be symmetric. The key formed in step 216, by concatenating the sum of and the absolute value of the difference between the source address 34 and/or the source port 36 and the destination address and/or the destination port 40, respectively, is thus symmetric.

The symmetric key formed in step 216 is then used to search for an entry for the corresponding session in a session table, via step 218. Step 218 typically includes hashing the symmetric key, then searching for an index of an entry in the session table which matches the hashed key. Because the symmetric key has been hashed, there may be collisions, i.e. more than one key which has the same hash value. Step 218 would thus include resolving these collisions to obtain an exact match for the symmetric key. In a preferred embodiment, a Patricia tree would be used to resolve collisions by testing certain bits of the symmetric key. In addition, a full comparison of the resultant of the search and the symmetric key would be performed in order to ensure that an exact match has been obtained. However, another method for finding the entry for the corresponding session key can be provided. Once the entry for the corresponding session table is obtained, the data stored in the entry can be used to forward the packet and session state information may be updated.

Figure 4:
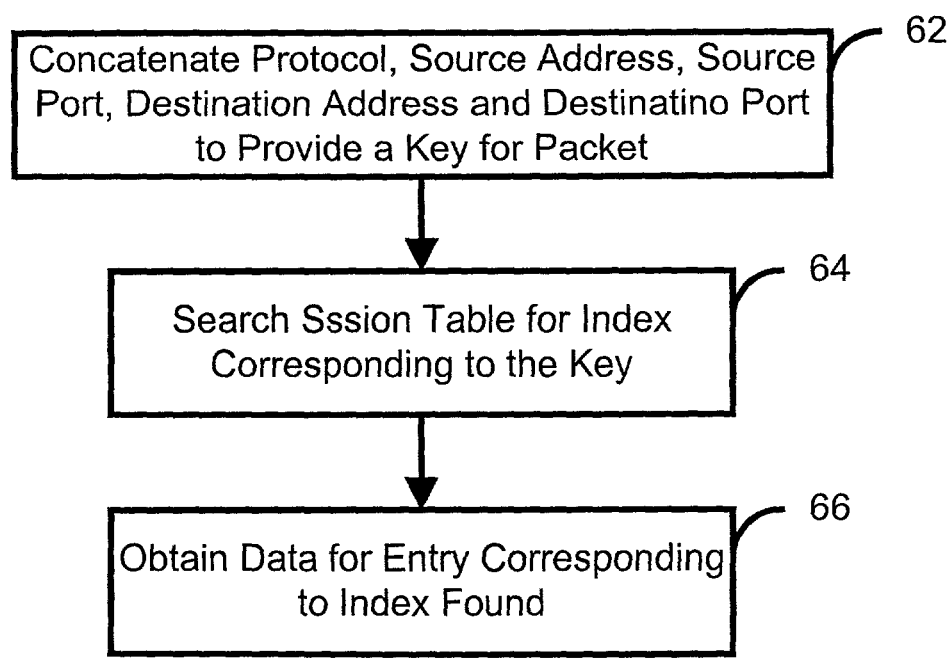
FIG. 4 is a flow chart depicting a conventional method for searching for information relating to a session.

Because the symmetric key is symmetric, the same symmetric key can be used to identify the session regardless of the direction of travel of the packet. As a result a single entry can be used for each session in the session table 106. Thus, entries 108 and 110 can be for different sessions. The size of the session table 106 can thus be cut in half. Thus, the memory 102 can, therefore, be used more efficiently. Furthermore, the number of insertions and deletions required to maintain the session table 106 can be reduced by substantially the same factor. As a result, the resources consumed in maintaining the session table 106 can also be reduced. Management of session state information can also be consolidated into a single entry per session rather than split or duplicated between two entries. Thus, the method 210 can allow the network processor 102 to more efficiently manage sessions. In addition, the length of the symmetric key provided in steps 212 through 216 is approximately the same as the length of conventional key used in the conventional method 60 described in FIG. 4. These lengths are approximately the same because the sum and the absolute value of the difference have approximately the same lengths as the original fields 34, 36, 38 and 40. The sum may be one bit longer because of the presence of a carry bit. Thus, there is little or no difference in the length of the symmetric key, and the overhead required to manage the symmetric key, provided using the method 210. As a result, the benefits of the method 210 are gained without requiring substantial changes in how the keys are handled by the system 100. Thus, the method 210 can more efficiently manage sessions.

A method and system has been disclosed for more efficiently identifying a session in a computer network. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for identifying sessions in a computer network, the session being between a first computer system and a second computer system exchanging a plurality of packets, each of the plurality of packets including source information and destination information relating to the first computer system and the second computer system, the system comprising:
   a memory for storing a session table including a plurality of entries; and
   a processor for providing a symmetric key, an entry of the plurality of entries of the session table for the session being accessed for the packet using the symmetric key, the symmetric key being a manipulation of the source information and the destination information, the symmetric key being associated with the plurality of packets traveling between the first computer and the second computer system, the processor further provides the symmetric key using a sum of the portion of the source information and the portion of the destination information and an absolute value of the difference between the portion of the source information and the portion of the destination information;
   wherein the manipulation includes providing a difference between a portion of the source information and a portion of the destination information.

2. The system of claim 1 wherein the processor provides the symmetric key utilizing an arithmetic manipulation of the source information and the destination information, the symmetric key being associated with the plurality of packets traveling between the first computer and the second computer system.

3. The system of claim 1 wherein the portion of the source information includes a source address and a source port and wherein the portion of the destination information include a destination address and a destination port.

4. The system of claim 3 wherein the processor provides the symmetric key by concatenating the sum and the absolute value of the difference.

5. The system of claim 4 wherein each of the plurality of packets further includes information relation to the session and wherein the processor further provides the symmetric key by concatenating the information.

6. The system of claim 5 wherein the information further includes a protocol type.

* * * * *